United States Patent [19]

Warnier et al.

[11] Patent Number: 5,371,174
[45] Date of Patent: Dec. 6, 1994

[54] PROCESS FOR THE PRODUCTION OF POLYTETRAMETHYLENE ADIPAMIDES

[75] Inventors: Jean M. M. Warnier, Stein (L.); Petronella M. Knape; Elisabeth de Goede, both of Sittard, all of Netherlands

[73] Assignee: DSM N.V., Heerlen, Netherlands

[21] Appl. No.: 950,293

[22] Filed: Sep. 24, 1992

[30] Foreign Application Priority Data

Sep. 24, 1991 [NL] Netherlands ................ 9101606

[51] Int. Cl.$^5$ ................ C08G 69/26; C08G 69/36
[52] U.S. Cl. ................ 528/335; 528/324; 528/325; 528/329.1
[58] Field of Search ............ 528/335, 324, 325, 329.1

[56] References Cited

U.S. PATENT DOCUMENTS

| | | | |
|---|---|---|---|
| 4,567,249 | 1/1986 | Fox et al. | 528/347 |
| 4,983,718 | 1/1991 | Blackmon et al. | 528/336 |
| 4,994,550 | 2/1991 | Pipper et al | 528/335 |
| 5,030,709 | 7/1991 | Pipper et al. | 528/335 |

*Primary Examiner*—John Kight, III
*Assistant Examiner*—P. Hampton-Hightower
*Attorney, Agent, or Firm*—Cushman, Darby & Cushman

[57] ABSTRACT

The invention relates to a process for the production of high-molecular-weight polytetramethylene adipamide from equivalent amounts of 1,4-diaminobutane and adipic acid at lower pressures. By supplying 1,4-diaminobutane at an advanced stage of the polycondensation a first polycondensate is obtained that can be extruded very well and that can be aftercondensed in the solid phase to obtain a product with a high molecular weight within a short time. Because of this a substantial overall gain in time is realized. It even appears to be possible to prepare a first polycondensate with a relative viscosity that is high enough for the polycondensate to be further processed into shaped objects.

The polycondensation can be carried out both in the melt and in solution.

The diaminobutane can be supplied both via the liquid and via the vapour phase.

6 Claims, No Drawings

PROCESS FOR THE PRODUCTION OF POLYTETRAMETHYLENE ADIPAMIDES

FIELD OF THE INVENTION

The invention relates to a process for the production of polytetramethylene adipamide through polycondensation of approximately equimolar amounts of 1,4-diaminobutane and adipic acid or amide-forming derivatives thereof or of the salt of these compounds.

BACKGROUND OF THE INVENTION

The production of polyamides, including polytetramethylene adipamide, is extensively described in U.S. Pat. Nos. 2,130,478 and 2,163,584, which also disclose the general principle for obtaining product of high molecular weight. Of the general requirements that are of particular importance for the production of high-molecular-weight polytetramethylene adipamide the following are mentioned:

a. As starting material use is made of virtually equimolar amounts of monomer, preferably in the form of the salt thereof.
b. The polycondensation can be effected in the presence or absence of a diluent.
c. To effect a shift in the balance of the polycondensation reaction to high-molecular-weight polyamide it is necessary to discharge water that is formed for example as a reaction product at the end of the polymerisation at least.
d. If one of the monomers is volatile, this monomer has to be supplied in an excess amount, of about 5% at most, at the start or has to be recirculated, optionally after fractionated distillation, or the polycondensation has to be carried out under pressure in a sealed reactor, in which case water vapour is discharged at atmospheric or lowered pressure only in a last process step.

The principle disclosed by Carothers has been implemented for the preparation of high-molecular-weight polytetramethylene adipamide in for example the following patents: JP-A-47-41111: Polycondensation of equimolar amounts of monomer in an autoclave under elevated pressure and subsequently for some time with release of the pressure, EP-B-0077106, EP-B-0038094 and EP-B-0160337: Polycondensation with an excess of 1,4-diaminobutane in an autoclave under elevated pressure followed by aftercondensation in the solid phase at atmospheric pressure and EP-A-0393544: Using equimolar amounts of the monomers or the salt at a slightly elevated pressure (1-10 bar) with recirculation to the beginning of the process of the 1,4-diaminobutane which is discharged, along with other volatile components, during the polycondensation via the vapour phase and is separated therefrom. The polycondensate obtained is then to be condensed further in the solid phase to obtain a high-molecular-weight product. In this last process, too, an excess of 1,4-diaminobutane is in fact supplied at the beginning of the polycondensation process.

However, the various disclosed processes present the following drawbacks.

With the process of JP-A-47-41111 it appears to be virtually impossible to obtain high-molecular-weight polyamide: $\eta_{rel}$ max. is approx. 2.2. The process described in the three EP-B publications present the drawback that the first process step, under elevated pressure, requires a relatively large amount of time, namely several hours. The process disclosed in EP-A-0393544 on the other hand presents the advantage of a particularly short first process step, but the polycondensate obtained with said process has only a relatively low degree of polymerisation, namely corresponding to a $\eta_{rel}$ of 1.5, and requires a particularly long aftercondensation of 10 to 40 hours in the solid phase. Because of the low degree of polymerisation of the polycondensate obtained after the first process step it is virtually impossible to draw fibres from it, as a result of which a very irregular prepolymer granulate is obtained, which presents practical drawbacks for the solid-phase aftercondensation and further processing.

SUMMARY AND OBJECTS OF THE INVENTION

The present invention relates to a process for the production of high-molecular-weight polytetramethylene adipamide from equivalent amounts of 1,4-diaminobutane and adipic acid at lower pressures. By supplying 1,4-diaminobutane at an advanced stage of the polycondensation i.e. after commencement of the polycondensation, a first polycondensate is obtained which can be easily extruded and which can be after condensed in the solid phase to obtain a product having a high-molecular weight within a short time. As a result, processing times are reduced, thus resulting in a substantial overall gain in time. The polycondensation can be efficaciously conducted in the melt or in solution. The 1,4-diaminobutane can be readily supplied in either the liquid or vapor phase.

DETAILED DESCRIPTION OF THE INVENTION

Most surprisingly, it has been found that the addition of 1,4-diaminobutane during the polycondensation process results, within a short time, in polytetramethylene adipamide of a quality suitable for drawing fibres which, thanks to a good ratio of carboxylic acid and amino terminal groups and the virtual lack of cyclic terminal groups, can be very quickly further condensed in the solid phase to obtain a high-molecular-weight product, which means an important overall gain in time for the entire process.

If optimum conditions are chosen, it even appears to be possible to prepare, in a single process step, a polyamide with such a high degree of polymerisation that it is directly suitable for a number of applications. A further advantage is that the process is relatively simple to carry out in comparison with for example the process of EP-A-0393544, as a result of which the process according to the invention is less sensitive to disturbances.

Wherever this application refers to polytetramethylene adipamide, this is also understood to be co- and terpolymers of which at least 50% of the units consist of tetramethylene adipamide units. Other copolymerisable monomers are for example other dicarboxylic acids, for example aliphatic, aromatic or cycloaliphatic carboxylic acids, which may optionally be substituted, other diamines, $\alpha,\omega$-aminocarboxylic acids, lactams, monomers supplying imide groups, monomers supplying polyester and polyether, etc.

The polycondensation process can be carried out in the absence of a diluent or in the presence thereof. Preferably, a dispersing agent is present at the beginning of the polycondensation at least in order to effect uniform heat transfer. Suitable dispersing agents are water, inert solvents, for example phenols and N-methylpyrrolidone, which are characterised by a high boiling point, and inert non-solvents, for example a hydrocarbon with a high boiling point.

Preferably, the salt of the diamine and the acid is used as a starting material in the process.

The polycondensation can be carried out both continuously and as a batch process. A continuous process is preferred. In principle, various embodiments are suitable. Both a reactor, operating on a plug-flow principle and an ideally stirred reactor may be used. Particularly suitable is a reactor operating on a plug-flow principle, for example a tube reactor in which for example static mixers effect ideal mixing locally.

The pressure at which the polycondensation is carried out may in principle be chosen freely. For a quick completion of the reaction use is preferably made of atmospheric pressure. The apparatus is preferably flushed using an inert gas, preferably nitrogen, to prevent the presence of oxygen.

The temperature at which the polycondensation is carried out may in principle be chosen freely within the range from the temperature at which the polycondensation takes place at an observable rate to the temperature at which observable decomposition or discolouration of the polycondensate takes place. In general, this temperature range is 180°–320° C.; preferably a temperature between 200° and 305° C. is chosen, more preferably between 230° and 295° C. For a favourable process it is preferable to choose the temperature so that the reaction mixture is constantly in the liquid phase.

The apparatus must be designed so that local overheating and 'blind angles' are avoided so as to prevent discolouration of the polycondensate.

The 1,4-diaminobutane may be supplied in several ways. For example, in a batch process an amount of 1,4-diaminobutane may be added in one go at a moment when the polycondensation has already started, for example halfway through the envisaged polycondensation time. It is also possible to add the 1,4-diaminobutane in several smaller portions at moments spread throughout the overall polycondensation period. In the case of addition in portions the 1,4-diaminobutane is preferably added as a liquid, optionally in the presence of a minor amount of water. A person skilled in the art can determine the sequence and the amount to be added through simple experimentation. They are in each case dependent on for example the chosen temperature, the flow rate of the inert flushing gas, the dimensions of the reactor, etc.

In general, the total amount of diaminobutane to be supplied will be between 0.5 and 8%, relative to the initial amount of diaminobutane in the starting mixture.

In a continuous process the 1,4-diaminobutane will preferably be supplied at different places in the reactor, the residual residence time still being important though. In film-type reactors, of the type described in for example BP-A-1.079.963, for continuous polyamide preparation the 1,4-diaminobutane is supplied to one or more levels below the level of the inlet of the nylon salt solution. The rotating scrapers effect good mixing. In the case of tube reactors of the disk type (see for example NL-A-6406638) the 1,4-diaminobutane can be supplied at one or more of the disks.

The process according to the invention can be carried out in most of the current polymerisation apparatuses if they contain the required limited adjustments for the supply of the 1,4-diaminobutane or if said adjustments can be made. The realisation of the process is however not limited to the known embodiments of polymerisation apparatus but may in principle take place in all polycondensation apparatuses that have a provision for the supply of the excess 1,4-diaminobutane.

Optionally, other substances may be added to the reactor contents before or during the polycondensation, for example catalysts, stabilisers, pigments and the like. It is very advantageous to add stabiliser, for example copper compounds, at an early stage of the polycondensation process.

For a further increase in the degree of polymerisation the polycondensate obtained according to the process of the invention is then optionally subjected to a solid-phase aftercondensation under the usual conditions, for example at a temperature between 220° and 280° C., in an inert gas atmosphere, optionally in the presence of water vapour. Usually a period of 4 hours or less will suffice for the aftercondensation, which is substantially shorter than in the case of the processes according to the state of the art.

The polytetramethylene adipamide that is obtained with the process according to the invention is very suitable for use as a raw material for fibres and films and products that are shaped via the melt, for example via extrusion, injection moulding, blow extrusion, etc.

The invention will be elucidated with reference to the following examples, without however being limited thereto.

EXAMPLES

Example I 25 grams of nylon 4,6 salt, obtained by reacting 1,4-diaminobutane with adipic acid in methanol, was heated in a 1-l round-bottom flask reactor with 10 wt. % water, relative to the nylon 4,6 salt, to a temperature of 280° C. at atmospheric pressure while a stream of nitrogen was passed over it. The reactor was provided with means enabling the supply of an 80 wt. % solution of 1,4-diaminobutane in water. After 5 minutes 2 cc of 80 wt. % diaminobutane solution in water was added to the reaction mixture and the reaction was continued for 5 more minutes. The polymerisate obtained after cooling was ground to small particles and was then condensed further at 260° C. in a nitrogen atmosphere containing water vapour. The relative viscosity (1 gram in 100 ml of 96% $H_2SO_4$) and the terminal groups content (in meq/g) were determined of the first polycondensate and of the polytetramethylene adipamide obtained after further condensation during 4 hours.

|  | first condensate | after further condensation |
|---|---|---|
| $\eta_{rel}$ | 2.01 | 3.5 |
| a [meq/g] | 0.081 | 0.028 |
| c [meq/g] | 0.075 | 0.053 |
| p [meq/g] | 0.030 | 0.017 | a = amino terminal groups
c = carboxy terminal groups
p = pyrrolidine terminal groups

Comparative experiment A

Example I was repeated, only now the 2 cc of 80 wt. % diaminobutane solution was present from the very start of the polycondensation.

The first condensate obtained after 10 minutes has a relative viscosity of only 1.45 and contains an insufficient amount of amino terminal groups, c−a=0.150.

Aftercondensation under the same conditions as in example I yields a polyamide with a relative viscosity of only 2.38 after 4 hours.

Example II

Example I was repeated, but instead of supplying 1,4-diaminobutane in the melt, after 4 minutes 1,4-diaminobutane was added to the stream of nitrogen passed over the reaction mixture by feeding the gas through an 80 wt. % diaminobutane solution in water at 65° C. After another 4 minutes the diaminobutane supply was stopped and the condensation reaction was continued for 2 minutes. Then the reactor contents were cooled by pouring them in a thin trickle into water, which, as in example I, yielded a thin thread of a polyamide that could be excellently chopped up into pellets.

4 hours' aftercondensation under the conditions of example I yielded a product with a high relative viscosity.

|  | first condensate | after further condensation |
| --- | --- | --- |
| $\eta_{rel}$ | 2.12 | 3.41 |
| a | 0.076 | 0.040 |
| c | 0.060 | 0.051 |
| p | 0.032 | 0.016 |

Comparative Experiment B

Example II was repeated, only the 1.4-diaminobutane was added to the nitrogen stream from the very start. After 10 minutes the reaction was stopped and the reactor contents were poured into water. However, aftercondensation of the ground first condensate for 4 hours at 260° C. yielded a product with a low molecular weight.

|  | first condensate | after further condensation |
| --- | --- | --- |
| $\eta_{rel}$ | 1.45 | 1.95 |
| a | 0.31 | 0.25 |
| c | 0.006 | 0.004 |
| p | 0.080 | 0.040 |

Example III 900 grams of a 40 wt. % solution of nylon 4,6 salt in N-methylpyrrolidone was heated to 300° C. in 15 minutes. Up to about 200° C. the water vapour produced was released at a pressure of 2 bar, from 200° C. to 300° C. the pressure was gradually lowered to below atmospheric pressure under a blanket of $N_2$, with discharge of the water produced. From 200° C. onwards a 10 wt. % 1,4-diaminobutane solution in N-methylpyrrolidone was supplied (5 grams of 1,4-diaminobutane in total). After cooling and the removal of the solvent, the polycondensate obtained was subjected to the solid-phase aftercondensation according to the previous examples for 3.5 hours. A product was obtained that had a high $\eta_{rel}$ of 4.13.

|  | first condensate | after further condensation |
| --- | --- | --- |
| $\eta_{rel}$ | 1.90 | 4.13 |
| a | 0.28 | 0.064 |
| c | 0.13 | 0.015 |
| p | 0.030 | 0.022 |

The above examples and comparative experiments clearly show that it is possible to produce polytetramethylene adipamide with a high molecular weight within a relatively short period of time with the process according to the invention. It also appears to be possible to obtain an end product with an excess of amino groups or an excess of carboxyl groups in a simple manner.

The examples of this application were carried out using relatively simple means. It will be clear to a person skilled in the art that the ratio of the terminal groups can be further optimised during the polycondensation via a more precise control of the supply of diaminobutane. It is moreover to be expected that this will lead to a first polycondensate with a relative viscosity of more than about 2.5, which makes it possible to directly process the polyamide into shaped objects, without having to subject the polycondensate to further aftercondensation. This can be realised for example by discharging the produced water vapour at the end of the polycondensation reaction, under reduced pressure.

The examples mentioned in this application show that the diaminobutane can be supplied both via the melt and via the gas phase. Likewise, the process according to the invention appears to be suitable for both polycondensation in the melt and in solution.

A person skilled in the art will be able to translate the principle of the invention, which is illustrated in the examples using batch processes, directly to continuous processes by replacing the time coordinate in the batch process by the place in the continuous process, as already mentioned in the specification.

It will also be clear to a person skilled in the art that when the process according to the invention is used to prepare copolyamides of tetramethylene adipamide, other volatile comonomers may optionally be supplied in the same manner. The ratios that are then to be used are partly a function of the volatility and the desired copolymer ratio.

We claim:

1. A process for producing high-molecular-weight polytetramethylene adipamide comprising polycondensing a reactant mixture consisting of equivalent amounts of 1,4-diaminobutane and adipic acid, or amide-forming derivatives thereof, or a salt thereof at a pressure of between 0.01 and 10 bar and at a temperature of between 180° and 320° C.; and adding an additional amount of 1,4-diaminobutane in the polycondensing step after the polycondensation has been initiated.

2. Process for the preparation of high-molecular-weight polytetramethylene adipamide according to claim 1, comprising melt polycondensing.

3. Process for the preparation of high-molecular-weight polytetramethylene adipamide according to claim 1, comprising polycondensing in the presence of an inert solvent.

4. Process according to claim 3, wherein the high-molecular-weight polytetramethylene adipamide obtained from the polycondensation is subjected to after condensation in a solid phase.

5. Process for the preparation of high-molecular-weight polytetramethylene adipamide according to claim 1, wherein said additional amount of 1,4-diaminobutane is added in the liquid phase.

6. Process for the preparation of high-molecular-weight polytetramethylene adipamide according to claim 1, wherein said additional amount of 1,4-diaminobutane is in the vapor phase.

* * * * *